US010260762B2

(12) United States Patent
Okajima et al.

(10) Patent No.: US 10,260,762 B2
(45) Date of Patent: Apr. 16, 2019

(54) DEHUMIDIFICATION DEVICE WITH MODE SELECTION CONTROL

(71) Applicant: Mitsubishi Electric Corporation, Tokyo (JP)

(72) Inventors: Keigo Okajima, Tokyo (JP); Keizo Fukuhara, Tokyo (JP); Manabu Tanaka, Tokyo (JP)

(73) Assignee: Mitsubishi Electric Corporartion, Tokyo (JP)

( * ) Notice: Subject to any disclaimer, the term of this patent is extended or adjusted under 35 U.S.C. 154(b) by 0 days.

(21) Appl. No.: 15/327,768

(22) PCT Filed: Sep. 30, 2014

(86) PCT No.: PCT/JP2014/076162
§ 371 (c)(1),
(2) Date: Jan. 20, 2017

(87) PCT Pub. No.: WO2016/051529
PCT Pub. Date: Apr. 7, 2016

(65) Prior Publication Data
US 2017/0205092 A1    Jul. 20, 2017

(51) Int. Cl.
*F24F 3/14* (2006.01)
*F24F 11/30* (2018.01)
(Continued)

(52) U.S. Cl.
CPC ........ *F24F 3/1429* (2013.01); *B01D 53/0454* (2013.01); *B01D 53/261* (2013.01); *F24F 11/30* (2018.01); *F24F 11/83* (2018.01); *B01D 53/0438* (2013.01); *B01D 2253/102* (2013.01); *B01D 2253/106* (2013.01); *B01D 2253/108* (2013.01); *B01D 2257/80* (2013.01); *B01D 2258/06* (2013.01); *B01D 2259/4009* (2013.01); *B01D 2259/40088* (2013.01); *F24F 11/61* (2018.01); *F24F 2110/10* (2018.01); *F24F 2110/20* (2018.01); *F24F 2110/30* (2018.01); *F24F 2203/021* (2013.01)

(58) Field of Classification Search
CPC .......... F24F 3/14; F24F 3/1411; F24F 3/1429; F24F 2110/20; F24F 2203/02; F24F 2203/021; F25B 2313/02343; F25B 2500/26; F25B 2500/27; F25B 2700/02; B01D 53/0454; B01D 53/261; B01D 2257/80; B01D 2259/40088; B01D 2259/4009; B01D 2259/40098
See application file for complete search history.

(56) References Cited

U.S. PATENT DOCUMENTS 5,129,234 A * 7/1992 Alford .................. G05D 22/02
                                                   62/176.6
6,089,972 A * 7/2000 Gunji .................... F24F 1/0011
                                                   454/233
(Continued)

FOREIGN PATENT DOCUMENTS

CN    103889550 A    6/2014
JP    2009-109126 A    5/2009
(Continued)

OTHER PUBLICATIONS

WO 2013/061829 (English Translation).*
(Continued)

*Primary Examiner* — Jonathan Bradford
(74) *Attorney, Agent, or Firm* — Posz Law Group, PLC

(57) ABSTRACT

A dehumidification device according to the present invention includes an operation control unit configured to switch between thermo-on for circulating refrigerant in a refrigerant circuit and thermo-off for suspending circulation of the refrigerant, and an operation mode control unit configured to switch an operation mode to any one of a first operation mode in which a moisture adsorption unit is caused to adsorb moisture and a second operation mode in which moisture retained in the moisture adsorption unit is caused to be desorbed. The operation mode control unit is configured to select the operation mode at a time when the thermo-on is switched from the thermo-off in response to the operation mode and a relative humidity of air in switching from the thermo-on to the thermo-off.

7 Claims, 5 Drawing Sheets

(51) Int. Cl.
  *F24F 11/83*    (2018.01)
  *B01D 53/04*    (2006.01)
  *B01D 53/26*    (2006.01)
  *F24F 110/20*   (2018.01)
  *F24F 110/30*   (2018.01)
  *F24F 110/10*   (2018.01)
  *F24F 11/61*    (2018.01)

(56) References Cited

U.S. PATENT DOCUMENTS

2009/0038326 A1* 2/2009 Matsui ............... F24F 3/1411
                                                    62/271
2014/0250930 A1   9/2014 Unezaki et al.

FOREIGN PATENT DOCUMENTS

| JP | 2009-109148 A | 5/2009 |
| JP | 2013-94681 A  | 5/2013 |
| JP | 5452565 B     | 3/2014 |
| JP | 2014-140808 A | 8/2014 |

OTHER PUBLICATIONS

International Search Report of the International Searching Authority dated Apr. 21, 2015 for the corresponding international application No. PCT/JP2014/076162 (and English translation).
Office Action dated Oct. 9, 2018 in corresponding Chinese Patent Application No. 201480080861.3 (and English translation).

* cited by examiner

FIG. 7

| | OPERATION MODE BEFORE THERMO-OFF | HUMIDITY IN SPACE TO BE DEHUMIDIFIED | HUMIDITY STATUS OF MOISTURE ADSORPTION UNIT | CHANGE IN MOISTURE ADSORPTION UNIT | OPERATION MODE WHEN THERMO-OFF IS DETECTED | OPERATION MODE IN RESTART |
|---|---|---|---|---|---|---|
| CONDITION PATTERN 1 | FIRST OPERATION MODE | LOW HUMIDITY | HIGH HUMIDITY | DESORPTION | SUSPENDED AFTER SECOND OPERATION MODE IS PERFORMED | FIRST OPERATION MODE |
| CONDITION PATTERN 2 | SECOND OPERATION MODE | LOW HUMIDITY | LOW HUMIDITY | NONE | SUSPENDED | FIRST OPERATION MODE |
| CONDITION PATTERN 3 | FIRST OPERATION MODE | HIGH HUMIDITY | HIGH HUMIDITY | NONE | SUSPENDED | SECOND OPERATION MODE |
| CONDITION PATTERN 4 | SECOND OPERATION MODE | HIGH HUMIDITY | LOW HUMIDITY | ADSORPTION | SUSPENDED | SECOND OPERATION MODE |

DEHUMIDIFICATION DEVICE WITH MODE SELECTION CONTROL

CROSS REFERENCE TO RELATED APPLICATION

This application is a U.S. national stage application of International Application No. PCT/JP2014/076162, filed on Sep. 30, 2014, the contents of which are incorporated herein by reference.

TECHNICAL FIELD

The present invention relates to a dehumidification device, and in particular, relates to a dehumidification device including a moisture adsorption unit and a refrigerant circuit.

BACKGROUND

Patent Literature 1 discloses a dehumidification device including a refrigerant circuit in which refrigerant circulates and a desiccant material that absorbs and desorbs moisture in air. The dehumidification device alternately switches a first operation mode to adsorb moisture from air by the desiccant material and a second operation mode to desorb moisture retained by the desiccant material.

Patent Literature

Patent Literature 1: Japanese Patent No. 5452565 (Claim 1)

In the dehumidification device including the refrigerant circuit in which the refrigerant circulates, to adjust a humidity in a space to be dehumidified to a desired humidity, in some cases, a state in which a compressor is operated to circulate the refrigerant in the refrigerant circuit (hereinafter, referred to as "thermo-on") and a state in which the compressor is suspended to stop circulation of the refrigerant (hereinafter, referred to as "thermo-off") are switched.

In the dehumidification device of the above-described Patent Literature 1, nothing is defined about relation between switching of operation modes of the first operation mode (adsorption) and the second operation mode (desorption) and the thermo-on and the thermo-off. Moreover, in the dehumidification device of Patent Literature 1, nothing is defined as the operation mode when operation of the dehumidification device is started (on startup).

For example, when the relative humidity in the space to be dehumidified is low and the thermo-off is performed during the operation in the first operation mode (adsorption), the moisture retained in the desiccant material is desorbed because air of low relative humidity circulates through the desiccant material. Consequently, the humidity in the space to be dehumidified is increased during the period of the thermo-off.

Moreover, for example, when the relative humidity in the space to be dehumidified is high and the thermo-off is performed during the operation in the second operation mode (desorption), the moisture in air is adsorbed to the desiccant material because air of high relative humidity circulates through the desiccant material. Consequently, when the thermo-on is performed again, the amount of moisture adsorbable to the desiccant material is reduced, and thus, a dehumidification capability is degraded.

As recent energy conservation measures, for example, when operation of a dehumidification device is suspended or when the operation is suspended for a long time, a user shuts off a main power supply of the dehumidification device in some cases. In this case, the dehumidification device cannot detect the relative humidity in the space to be dehumidified. Consequently, the relative humidity of air flowing into the desiccant material under suspension of the dehumidification device is unknown. Consequently, the amount of moisture retained in the desiccant material when the operation is restarted is also unknown. Thus, when operation of the dehumidification device is restarted, the operation mode suitable to the adsorption amount of moisture of the desiccant material is unknown.

As described above, in the conventional dehumidification device, an operation mode suitable to characteristics of the moisture adsorption unit, such as the desiccant material, cannot be selected during a transition period of the operation state, such as the thermo-on, the thermo-off, and restarting of operation of the dehumidification device.

SUMMARY

The present invention has been made to solve the above-described problem, and provides a dehumidification device capable of selecting an operation mode suitable to characteristics of a moisture adsorption unit, such as a desiccant material, during a transition period of an operation state, such as the thermo-on, the thermo-off, and restarting of operation of the dehumidification device.

A dehumidification device according to an embodiment of the present invention includes a refrigerant circuit in which a compressor, a flow path switching device, a first heat exchanger, an expansion device, and a second heat exchanger are sequentially connected by pipes, to allow refrigerant to circulate in the refrigerant circuit, a moisture adsorption unit provided between the first heat exchanger and the second heat exchanger, the moisture adsorption unit adsorbing and desorbing moisture in air, an air-sending device passing air in a space to be dehumidified through the first heat exchanger, the moisture adsorption unit, and the second heat exchanger in order and then sending out the air to the space to be dehumidified, a humidity detection device measuring a relative humidity of the air in the space to be dehumidified, and a control device controlling the compressor and the flow path switching device. The control device includes an operation control unit controlling the compressor to switch between thermo-on for circulating the refrigerant in the refrigerant circuit and thermo-off for suspending circulation of the refrigerant, and an operation mode control unit controlling the flow path switching device to switch an operation mode to any one of a first operation mode in which the moisture adsorption unit is caused to adsorb moisture by causing the first heat exchanger to act as an evaporator and causing the second heat exchanger to act as a condenser or a radiator and a second operation mode in which moisture retained in the moisture adsorption unit is caused to be desorbed by causing the first heat exchanger to act as a condenser or a radiator and causing the second heat exchanger to act as an evaporator. The operation mode control unit selects the operation mode at a time when the thermo-on is switched from the thermo-off in response to the operation mode and the relative humidity of the air in switching from the thermo-on to the thermo-off.

The dehumidification device according to the embodiment of the present invention selects an operation mode when the thermo-on is switched from the thermo-off in response to an operation mode and a relative humidity of air in switching from the thermo-on to the thermo-off. Consequently, the operation mode suitable to characteristics of the moisture adsorption unit can be selected.

BRIEF DESCRIPTION OF DRAWINGS

FIG. 7 is a chart showing a relation between conditions during an operation transition period and an operation mode of the dehumidification device according to Embodiment 1 of the present invention.

DETAILED DESCRIPTION

Embodiment 1

Figure 1:
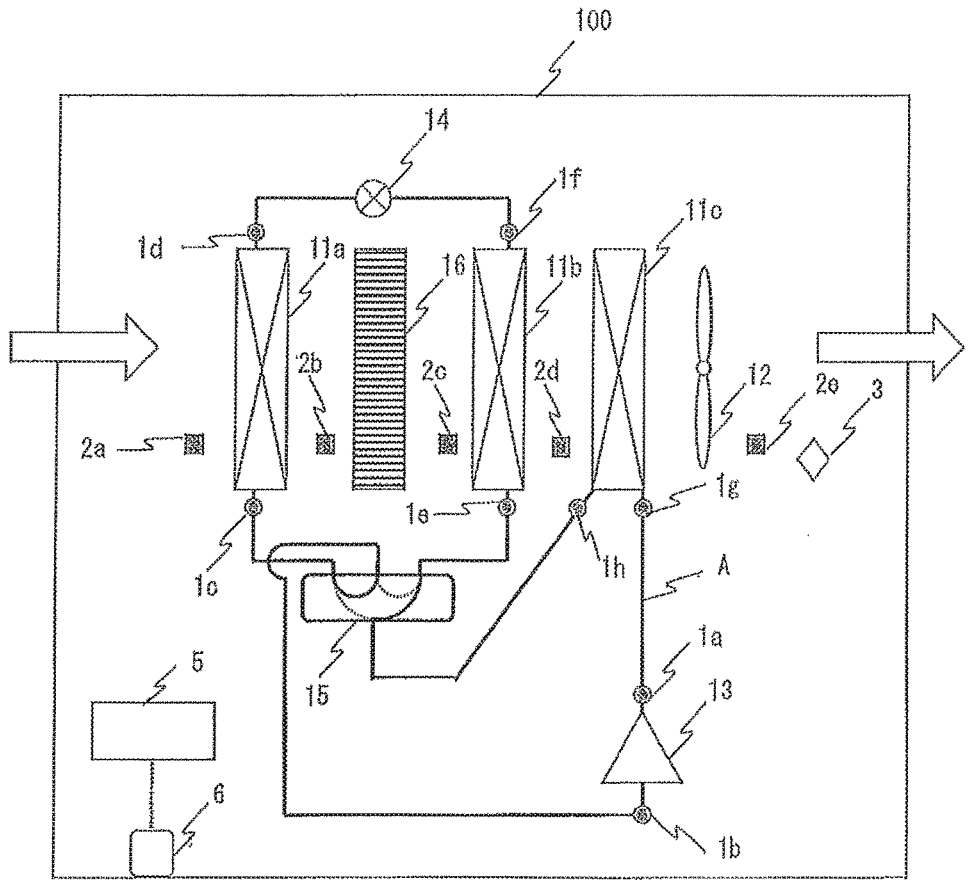
FIG. 1 is a configuration diagram of a dehumidification device according to Embodiment 1 of the present invention.

FIG. 1 is a configuration diagram of a dehumidification device according to Embodiment 1 of the present invention. Hereinafter, the configuration of the dehumidification device according to Embodiment 1 will be described.

<<Refrigerant Circuit Configuration>>

As shown in FIG. 1, a dehumidification device 100 includes a refrigerant circuit A, in which a compressor 13, a four-way valve 15, a first heat exchanger 11a, an expansion device 14, a second heat exchanger 11b, and a third heat exchanger 11c are sequentially connected by pipes, and refrigerant circulates in the refrigerant circuit.
(Compressor)

The compressor 13 compresses and discharges adsorbed refrigerant. The compressor 13 is, for example, a displacement compressor that is driven by a motor. Note that, in the present invention, the number of compressors 13 is not limited to one, and two or more compressors 13 may be connected in parallel or in series.
(Heat Exchanger)

The first heat exchanger 11a, the second heat exchanger 11b, and the third heat exchanger 11c (hereinafter, also referred to as heat exchangers 11a to 11c) are, for example, fin-and-tube heat exchangers of a cross-fin type each formed of a heat transfer pipe and multiple fins. The first heat exchanger 11a, the expansion device 14, and the second heat exchanger 11b are connected in series. One end of the third heat exchanger 11c is connected to a discharge side of the compressor 13, and the other end of the third heat exchanger 11c is connected to the four-way valve 15.

(Expansion Device)

The expansion device 14 reduces pressure of the refrigerant. One end of the expansion device 14 is connected to the first heat exchanger 11a, and the other end of the expansion device 14 is connected to the second heat exchanger 11b. The expansion device 14 is capable of adjusting the flow rate of the refrigerant flowing through the refrigerant circuit A. The expansion device 14 is, for example, an electronic expansion valve capable of adjusting an opening degree of expansion by a stepping motor, a mechanical expansion valve adopting a diaphragm for a pressure receiver, or a capillary tube.
(Four-Way Valve)

The four-way valve 15, which is a flow path switching device, switches a refrigerant flow path to switch a flow of the refrigerant in the refrigerant circuit A. The four-way valve 15 is connected to a side of the first heat exchanger 11a where the expansion device 14 is not connected, a side of the second heat exchanger 11b where the expansion device 14 is not connected, a side of the third heat exchanger 11c where the discharge side of the compressor 13 is not connected, and a suction side of the compressor 13. The flow path of the four-way valve 15 is switched, and thus, the circulation direction of the refrigerant in the refrigerant circuit A is reversed. Note that the four-way valve 15 may be other flow path switching devices.
(Refrigerant)

The refrigerant circulating in the refrigerant circuit A is, for example, an HFC refrigerant, such as R410A, R407C and R404A, an HCFC refrigerant, such as R22 and R134a, a natural refrigerant, such as carbon hydride and helium, or other refrigerants.
(Control Device)

The dehumidification device 100 includes a control device 5 that controls each component and a controller 6 for inputting setting operation from a user to the control device 5. Note that the control device 5 can be a circuit device or a computing device, including a CPU, programmed with algorithms to perform the functions described herein.
<<Moisture Adsorption Unit>>

As shown in FIG. 1, the dehumidification device 100 includes a moisture adsorption unit 16. The moisture adsorption unit 16 is provided between the first heat exchanger 11a and the second heat exchanger 11b, and absorbs and desorbs moisture in air passing through an air path, which will be described later. The moisture adsorption unit 16 is formed of a material through which air can pass, such as a porous flat plate, whose surface is applied with an adsorbent by coating, surface processing, or impregnation. As the adsorbent, those having characteristics of moisture adsorption from air of relatively high humidity and moisture desorption to air of relatively low humidity, such as zeolite, silica gel, and active carbon, are used. The moisture adsorption unit 16 is formed of a porous flat plate in a polygonal shape that extends along the cross section of the air path to cause the air to pass in the thickness direction. Such a configuration is to obtain a large ventilating cross-sectional area from the cross-sectional area of the air path in the dehumidification device 100. The moisture adsorption unit 16 is in a rectangular shape as shown in FIG. 1. Note that the shape of the moisture adsorption unit 16 is not limited to the rectangular shape, but may be of an arbitrary shape.

Figure 2:
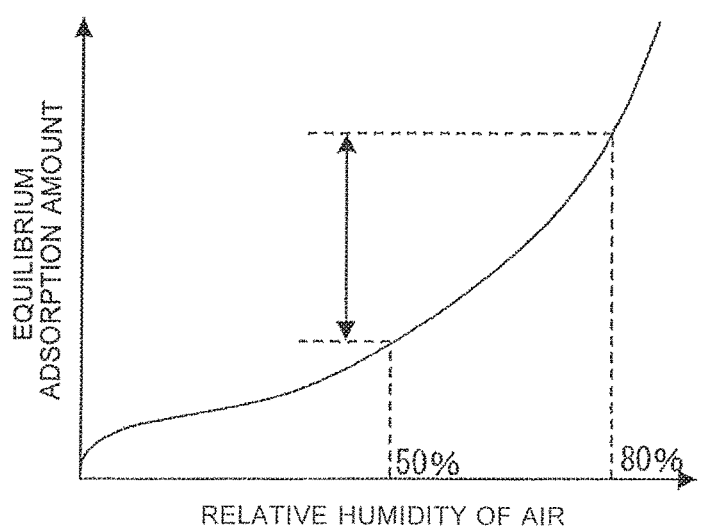
FIG. 2 is an adsorption isothermal diagram showing transition of an equilibrium adsorption amount of a moisture adsorption unit against a relative humidity according to Embodiment 1 of the present invention.

FIG. 2 is an adsorption isothermal diagram showing transition of an equilibrium adsorption amount of a moisture adsorption unit against a relative humidity according to Embodiment 1 of the present invention. In FIG. 2, the horizontal axis indicates the relative humidity of air flowing into the moisture adsorption unit 16, and the vertical axis indicates an equilibrium adsorption amount (an amount of adsorbable moisture) of the adsorbent in the moisture adsorption unit 16.

As shown in FIG. 2, variations in the equilibrium adsorption amount of the moisture adsorption unit 16 are determined by the relative humidity of air flowing into the moisture adsorption unit 16. When air of high relative humidity flows into the moisture adsorption unit 16, the moisture in the moisture adsorption unit 16 becomes less likely to be discharged, and consequently, the amount of moisture absorbable to the moisture adsorption unit 16 is increased. On the other hand, when air of low relative humidity flows into the moisture adsorption unit 16, the moisture in the moisture adsorption unit 16 becomes more likely to be discharged, and consequently, the amount of moisture absorbable to the moisture adsorption unit 16 is decreased.

As the adsorbent of the moisture adsorption unit 16 according to Embodiment 1, for example, an adsorbent with a large difference between the equilibrium adsorption amount with the relative humidity of 80% or more and the equilibrium adsorption amount with the relative humidity of 40% to 60% is used. Consequently, an adsorption capability and a desorption capability of the moisture adsorption unit 16 can be increased. Note that, in FIG. 2, an arrow indicates the difference between the equilibrium adsorption amount when the relative humidity is 50% and the equilibrium adsorption amount when the equilibrium adsorption amount is 80%.

<<Air Path Configuration>>

As indicated by arrows in FIG. 1, in the dehumidification device 100, an air path is formed in which air of the space to be dehumidified circulates through the first heat exchanger 11a, the moisture adsorption unit 16, the second heat exchanger 11b, and the third heat exchanger 11c in order. In the air path of the dehumidification device 100, an air-sending device 12 is disposed. The air-sending device 12 sucks air in the space to be dehumidified into a housing of the dehumidification device 100, circulates the air through the first heat exchanger 11a, the moisture adsorption unit 16, the second heat exchanger 11b, and the third heat exchanger 11c in order, and then sends out the air again to the space to be dehumidified. The air-sending device 12 can change the flow rate of air passing through the air path in the dehumidification device 100. The air-sending device 12 is a fan, such as a centrifugal fan and a multi-blade fan driven by a motor, such as a DC fan motor. Note that an AC fan motor that generates a constant air flow rate may also be used.

Note that, in FIG. 1, the air-sending device 12 is disposed at the most downstream location of the air path; however, the present invention is not limited to the configuration. As long as air of the space to be dehumidified passes through the heat exchangers 11a to 11c and the moisture adsorption unit 16, the air-sending device 12 may be disposed at the most upstream location, and the position of arrangement is not limited.

<<Disposition of Sensors in Refrigerant Circuit>>

In the refrigerant circuit A of the dehumidification device 100, various kinds of sensors are disposed. On the discharge side of the compressor 13, a temperature sensor 1a that measures the temperature of refrigerant is disposed. On the suction side of the compressor 13, a temperature sensor 1b that measures the temperature of refrigerant is disposed. Moreover, the refrigerant circuit A includes temperature sensors 1g and 1h that measure temperatures of refrigerant flowing into and flowing out from the third heat exchanger 11c. The refrigerant circuit A further includes temperature sensors 1e and 1f that measure temperatures of refrigerant flowing into and flowing out from the second heat exchanger 11b. The refrigerant circuit A further includes temperature sensors 1c and 1d that measure temperatures of refrigerant flowing into and flowing out from the first heat exchanger 11a.

<<Disposition of Sensors in Air Path>>

In the air path, temperature-humidity sensors 2a to 2e and a wind speed sensor 3 are disposed. The temperature-humidity sensors 2a to 2e are sensors each measuring any one of a dry-bulb temperature, a relative humidity, a dew-point temperature, an absolute humidity and a wet-bulb temperature. The temperature-humidity sensor 2a measures the temperature and humidity of air after flowing into the dehumidification device 100 from the space to be dehumidified and before passing through the first heat exchanger 11a. The temperature-humidity sensor 2b measures the temperature and humidity of air after passing through the first heat exchanger 11a and before passing through the moisture adsorption unit 16. The temperature-humidity sensor 2c measures the temperature and humidity of air after passing through the moisture adsorption unit 16 and before passing through the second heat exchanger 11b. The temperature-humidity sensor 2d measures the temperature and humidity of air after passing through the second heat exchanger 11b and before passing through the third heat exchanger 11c. The temperature-humidity sensor 2e measures the temperature and humidity of air after passing through the third heat exchanger 11c. The wind speed sensor 3 measures the wind speed of air passing through the air path. The disposed position of the wind speed sensor 3 may be any position as long as the wind speed of the air passing through the air path can be measured, and disposition is not limited.

<<Measurement Control System Configuration>>

Figure 3:
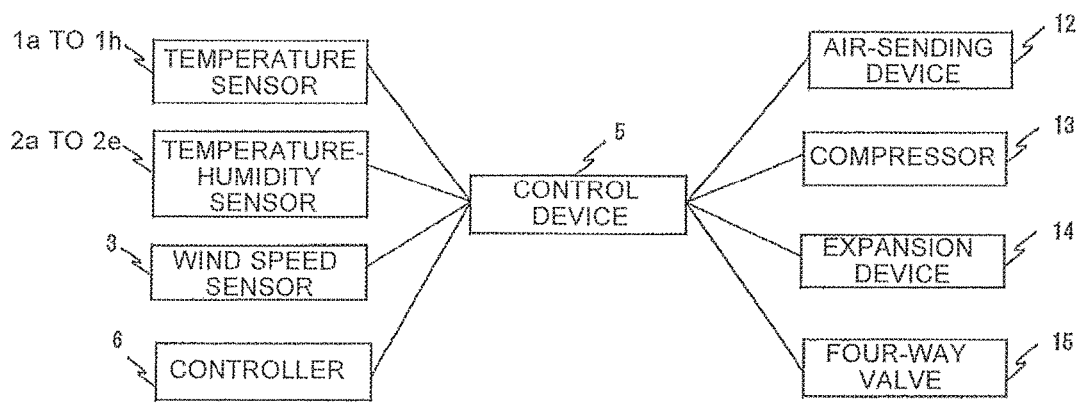
FIG. 3 is a block configuration diagram showing a measurement control system of the dehumidification device according to Embodiment 1 of the present invention.

FIG. 3 is a block configuration diagram showing a measurement control system of the dehumidification device according to Embodiment 1 of the present invention.

As shown in FIG. 3, the control device 5 obtains detection values from the temperature sensors 1a to 1h, the temperature-humidity sensors 2a to 2e, and the wind speed sensor 3. On the basis of the various kinds of obtained information items, the control device 5 controls the air-sending device 12, the compressor 13, the expansion device 14, and the four-way valve 15.

<<Description of Operations>>

Next, operations of the dehumidification device 100 according to Embodiment 1 will be described.

When an operation starting signal is received from the controller 6, the control device 5 obtains each sensor value, and, on the basis of the information, operates each of the compressor 13, the air-sending device 12, the expansion device 14, and the four-way valve 15, to thereby perform dehumidification operation. During the dehumidification operation, the control device 5 performs the first operation mode and the second operation mode alternately by switching the four-way valve 15. Hereinafter, details of each of the first operation mode and the second operation mode will be described.

(Refrigerant Flow in First Operation Mode)

In the first operation mode, the flow path of the four-way valve 15 is switched to the flow path indicated by solid lines in FIG. 1. Consequently, the four-way valve 15 connects the third heat exchanger 11c and the second heat exchanger 11b, and also connects the first heat exchanger 11a and the suction side of the compressor 13. When the flow path of the four-way valve 15 is switched to the flow path indicated by the solid lines in FIG. 1, the refrigerant discharged from the compressor 13 flows to the third heat exchanger 11c. The third heat exchanger 11c acts as a condenser, and a part of the refrigerant flowing into the third heat exchanger 11c is condensed and liquefied when the refrigerant exchanges heat with air. The refrigerant flowing out from the third heat exchanger 11c passes through the four-way valve 15 and flows into the second heat exchanger 11b. The second heat exchanger 11b acts as a condenser, and the refrigerant flowing into the second heat exchanger 11b is condensed and liquefied when the refrigerant exchanges heat with air, and then the refrigerant flows to the expansion device 14. The pressure of the refrigerant flowing out from the second heat exchanger 11b is reduced by the expansion device 14, and then the refrigerant flows to the first heat exchanger 11a. The first heat exchanger 11a acts as an evaporator, and the refrigerant flowing into the first heat exchanger 11a exchanges heat with air, is evaporated, and then passes through the four-way valve 15 to be sucked into the compressor 13 again.

(Refrigerant Flow in Second Operation Mode)

In the second operation mode, the flow path of the four-way valve 15 is switched to the flow path indicated by dotted lines in FIG. 1. Consequently, the four-way valve 15 connects the third heat exchanger 11c and the first heat exchanger 11a, and also connects the second heat exchanger 11b and the suction side of the compressor 13. When the flow path of the four-way valve 15 is switched to the flow path indicated by the dotted lines in FIG. 1, the refrigerant discharged from the compressor 13 flows to the third heat exchanger 11c. The third heat exchanger 11c acts as a condenser, and a part of the refrigerant flowing into the third heat exchanger 11c is condensed and liquefied when the refrigerant exchanges heat with air. The refrigerant flowing out from the third heat exchanger 11c passes through the four-way valve 15 and flows into the first heat exchanger 11a. The first heat exchanger 11a acts as a condenser, and the refrigerant flowing into the first heat exchanger 11a is condensed and liquefied when the refrigerant exchanges heat with air, and then the refrigerant flows to the expansion device 14. The pressure of the refrigerant flowing out from the first heat exchanger 11a is reduced by the expansion device 14, and then the refrigerant flows to the second heat exchanger 11b. The second heat exchanger 11b acts as an evaporator, and the refrigerant flowing into the second heat exchanger 11b exchanges heat with air, is evaporated, and then passes through the four-way valve 15 to be sucked into the compressor 13 again.

As described above, the dehumidification device 100 according to Embodiment 1 selectively causes the first heat exchanger 11a and the second heat exchanger 11b to act as the condenser and the evaporator. In other words, in the first operation mode, the first heat exchanger 11a is caused to act as the evaporator and the second heat exchanger 11b is caused to act as the condenser. Moreover, in the second operation mode, the first heat exchanger 11a is caused to act as the condenser and the second heat exchanger 11b is caused to act as the evaporator.

(Temperature and Humidity Transition of Air in First Operation Mode)

Figure 4:
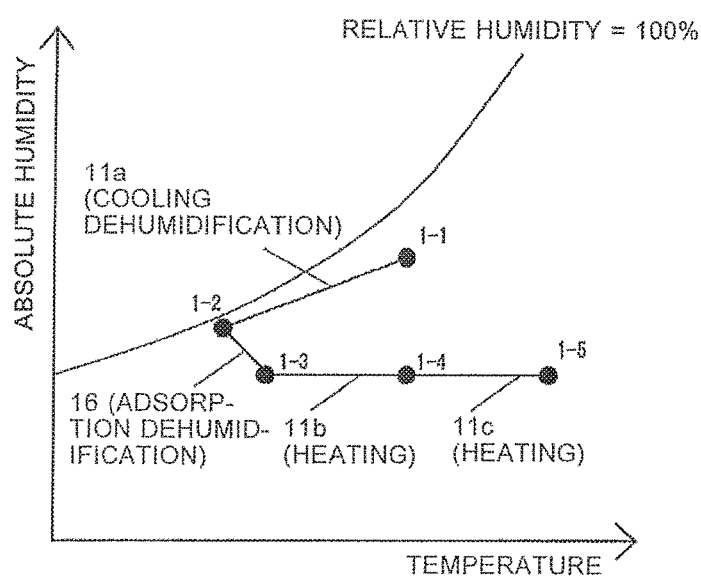
FIG. 4 is a psychrometric chart showing transition of temperature and humidity in a first operation mode of the dehumidification device according to Embodiment 1 of the present invention.

FIG. 4 is a psychrometric chart showing transition of temperature and humidity in the first operation mode of the dehumidification device according to Embodiment 1 of the present invention. In FIG. 4, the vertical axis indicates the absolute humidity of air and the horizontal axis indicates the dry-bulb temperature of air. Moreover, the curve in FIG. 4 indicates saturated air (relative humidity=100%). Moreover, in FIG. 4, the point 1-1 indicates the state of air flowing into the air path of the dehumidification device 100. The point 1-2 indicates the state of air after passing through the first heat exchanger 11a. The point 1-3 indicates the state of air after passing through the moisture adsorption unit 16. The point 1-4 indicates the state of air after passing through the second heat exchanger 11b. The point 1-5 indicates the state of air after passing through the third heat exchanger 11c.

In the first operation mode, introduced air sucked into the dehumidification device 100 from the space to be dehumidified (point 1-1) is sent to the first heat exchanger 11a. Here, the introduced air is cooled by the first heat exchanger 11a that acts as the evaporator. When air passing through the first heat exchanger 11a is cooled down to the dew-point temperature or less, the air becomes dehumidified air (point 1-2), from which the moisture has been removed, and is sent to the moisture adsorption unit 16. At this time, as the relative humidity of the air cooled and dehumidified becomes as high as around 70% RH to 90% RH, the adsorbent of the moisture adsorption unit 16 is more likely to adsorb the moisture. The introduced air having been cooled is dehumidified by adsorption of moisture by the adsorbent of the moisture adsorption unit 16 to be changed to the state of high temperature and low humidity, and flows into the second heat exchanger 11b (point 1-3). As the second heat exchanger 11b acts as the condenser, the air passing through the second heat exchanger 11b is heated, and the temperature of the air is increased (point 1-4). Air passing through the second heat exchanger 11b flows into the third heat exchanger 11c. As the third heat exchanger 11c acts as the condenser, the temperature of air passing through the third heat exchanger 11c is increased (point 1-5), and the air is discharged from the dehumidification device 100 to the space to be dehumidified.

(Temperature and Humidity Transition of Air in Second Operation Mode)

Figure 5:
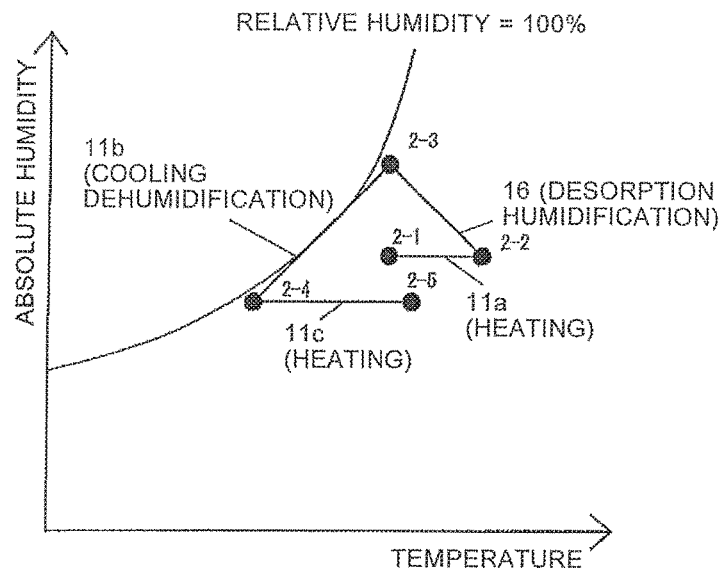
FIG. 5 is a psychrometric chart showing transition of temperature and humidity in a second operation mode of the dehumidification device according to Embodiment 1 of the present invention.

FIG. 5 is a psychrometric chart showing transition of temperature and humidity in the second operation mode of the dehumidification device according to Embodiment 1 of the present invention. In FIG. 5, the vertical axis indicates the absolute humidity of air and the horizontal axis indicates the dry-bulb temperature of air. Moreover, the curve in FIG. 5 indicates saturated air (relative humidity=100%). Moreover, in FIG. 5, the point 2-1 indicates the state of air flowing into the air path of the dehumidification device 100. The point 2-2 indicates the state of air after passing through the first heat exchanger 11a. The point 2-3 indicates the state of air after passing through the moisture adsorption unit 16. The point 2-4 indicates the state of air after passing through the second heat exchanger 11b. The point 2-5 indicates the state of air after passing through the third heat exchanger 11c.

In the second operation mode, introduced air sucked into the dehumidification device 100 from the space to be dehumidified (point 2-1) is sent to the first heat exchanger 11a. Here, the introduced air is heated by the first heat exchanger 11a that acts as the condenser, and the temperature of the air is increased (point 2-2), and then the introduced air is sent to the moisture adsorption unit 16. At this time, the heated air is humidified through desorption of moisture in the adsorbent of the moisture adsorption unit 16 to be changed to the state of low temperature and high humidity, and flows into the second heat exchanger 11b (point 2-3). As the second heat exchanger 11b acts as the evaporator, the air passing through the second heat exchanger 11b is cooled. When air passing through the second heat exchanger 11b is cooled down to the dew-point temperature or less, the air becomes dehumidified air (point 2-4), from which the moisture has been removed. Air passing through the second heat exchanger 11b flows into the third heat exchanger 11c. As the third heat exchanger 11c acts as the condenser, the temperature of air passing through the third heat exchanger 11c is increased (point 2-5), and the air is discharged from the dehumidification device 100 to the space to be dehumidified.

Note that, in Embodiment 1 the case is described in which the third heat exchanger 11c acting as the condenser is disposed at the most downstream location of the air path; however, the present invention is not limited to the configuration. For example, the third heat exchanger 11c may be omitted. Moreover, for example, the third heat exchanger 11c may be omitted and an electric heater or other devices for heating air may be provided.

(Operation Mode Switching Control During Dehumidification Operation)

When the dehumidification operation is performed, the dehumidification device 100 repeatedly absorbs and desorbs moisture in the moisture adsorption unit 16 by alternately switching the first operation mode and the second operation mode. The switching control of the first operation mode and the second operation mode during the dehumidification operation is on the basis of, for example, time, a temperature difference, an absolute humidity difference, relative humidity variation, air path pressure loss variation (when the moisture adsorption unit 16 swells by adsorption and the pressure loss of air passing through the moisture adsorption unit 16 is increased) or other factors between before and after air passing through the moisture adsorption unit 16. Note that the determination about switching during the dehumidification operation is not limited to the configuration. Whether or not the adsorption-desorption reaction of the moisture adsorption unit 16 is sufficiently expressed is only required to be known, and the control of the mode of the detection unit is not limited.

<<Operation Mode Switching Control During Operation Transition Period>>

Hereinafter, a description will be given of the operation mode switching control during the operation transition period of the dehumidification device 100 (thermo-on, thermo-off, startup, and suspension).

<<Control Under Thermo-On and Thermo-Off>>

Figure 6:
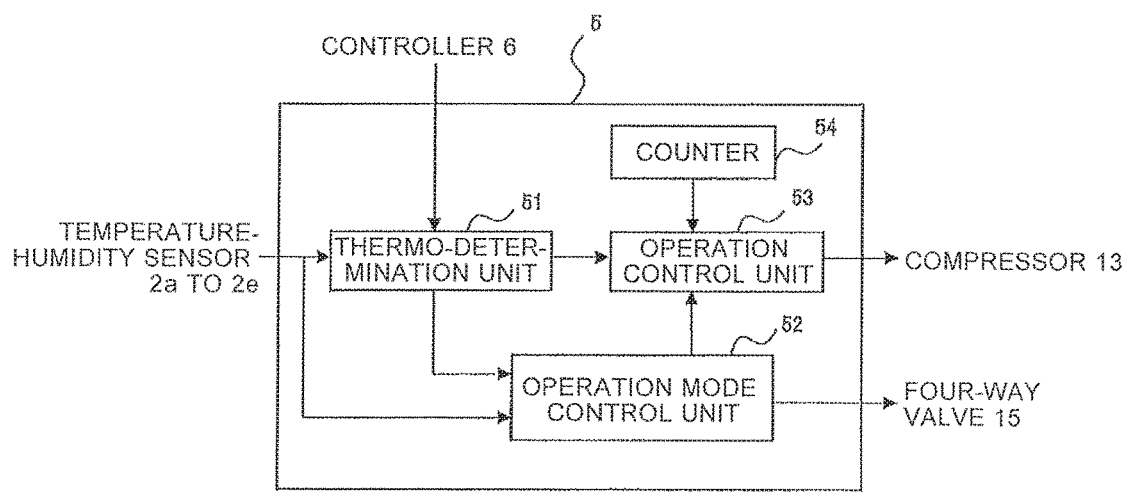
FIG. 6 is a functional configuration diagram showing a control device of the dehumidification device according to Embodiment 1 of the present invention.

FIG. 6 is a functional configuration diagram showing a control device of the dehumidification device according to Embodiment 1 of the present invention.

As shown in FIG. 6, the control device 5 includes a thermo-determination unit 51, an operation mode control unit 52, an operation control unit 53, and a counter 54. The thermo-determination unit 51 compares a set humidity obtained from the controller 6 with the relative humidity obtained from the temperature-humidity sensor 2a (the relative humidity in the space to be dehumidified). The thermo-determination unit 51 determines that the thermo-off is performed when the relative humidity in the space to be dehumidified is lower than the set humidity, and determines that the thermo-on is performed when the relative humidity in the space to be dehumidified is the set humidity or higher. In response to the determination result of the thermo-determination unit 51, the operation control unit 53 controls the compressor 13, the expansion device 14, and the air-sending device 12, to thereby switch between the thermo-on in which the refrigerant circulates through the refrigerant circuit A and the thermo-off in which the circulation of refrigerant is suspended. Moreover, the operation control unit 53 obtains the operation time measured by the counter 54.

In response to the determination result of the thermo-determination unit 51 and the relative humidity obtained from the temperature-humidity sensor 2a (the relative humidity in the space to be dehumidified), the operation mode control unit 52 selects the operation mode during the operation transition period of thermo-off and thermo-on and switches the four-way valve 15.

Here, a relation between conditions during the operation transition period and the operation mode will be described.

FIG. 7 is a chart showing the relation between conditions during the operation transition period and the operation mode of the dehumidification device according to Embodiment 1 of the present invention.

As shown in FIG. 7, the conditions during the operation transition period of the dehumidification device are divided into four patterns (hereinafter, condition patterns 1 to 4) depending on the operation mode and the relative humidity in the space to be dehumidified before thermo-off. Hereinafter, details of each condition pattern will be described.

(Condition Pattern 1)

A description will be given of, in the case of low humidity in the space to be dehumidified, the operation mode when the thermo-off is performed during the operation in the first operation mode and then the thermo-on is performed again.

In the case of air of low humidity in the space to be dehumidified (for example, the relative humidity is 50% or less), when the thermo-off is performed during the operation in the first operation mode, as the relative humidity of air flowing into the moisture adsorption unit 16 is low, the moisture retained by the moisture adsorption unit 16 is desorbed, to thereby cause high humidity in the space to be dehumidified. In other words, as described in the above "Temperature and humidity transition of air in first operation mode", the relative humidity of air flowing into the moisture adsorption unit 16 during the first operation mode becomes, for example, as high as around 70% RH to 90% RH. Consequently, when air of low relative humidity flows into the moisture adsorption unit 16 after the thermo-off is performed, the moisture retained by the moisture adsorption unit 16 is desorbed. Moreover, for air conditioning of the space to be dehumidified, operation of the air-sending device 12 is continued when thermo-off is performed in some cases. In this case, a desorption amount of moisture per unit time is increased as compared to the case in which the air-sending device 12 is suspended.

Consequently, when the operation mode is the first operation mode, the thermo-determination unit 51 determines that the thermo-off is performed, and the relative humidity of air in the space to be dehumidified is lower than the preset humidity, the operation mode control unit 52 switches the operation mode to the second operation mode. Then, the operation control unit 53 performs the thermo-off after the operation time in the second operation mode is continued for a certain preset time.

As described above, by performing operation in the second operation mode for a certain time before the thermo-off is performed, the temperature of air sent to the moisture adsorption unit 16 is increased, and thus, the moisture retained by the moisture adsorption unit 16 can be desorbed. Moreover, even when the thermo-off is switched from the second operation mode is performed for a certain time, as the adsorption amount of moisture retained by the moisture adsorption unit 16 is small, the moisture is not desorbed, and thus, the space to be dehumidified does not become highly humid. Note that, as a certain time, a time during which the moisture can be desorbed from the moisture adsorption unit 16 is set. Note that, as the desorption time differs depending on the size of the moisture adsorption unit 16, the setting of the certain time may be changed by the controller 6.

Moreover, the operation mode control unit 52 selects the first operation mode as the operation mode to restart the thermo-on from the state of the thermo-off. As described above, by performing the second operation mode for a certain time during the thermo-off, the amount of moisture adsorbed by the moisture adsorption unit 16 is decreased, and consequently, when the thermo-on is restarted, the operation for adsorbing the moisture in air by the first operation mode can be performed. Moreover, in the first operation mode, in addition to cooling and dehumidification by the refrigerant in the first heat exchanger 11a, dehumidification by moisture adsorption of the moisture adsorption unit 16 is also performed. Consequently, by performing the first operation mode to restart the thermo-on, the amount of dehumidification larger than that in the second operation mode can be secured.

(Condition Pattern 2)

A description will be given of, in the case of low humidity in the space to be dehumidified, the operation mode when the thermo-off is performed during the operation in the second operation mode and then the thermo-on is performed again.

During the operation in the second operation mode, the moisture adsorption unit 16 has desorbed the moisture. In the case of low humidity in the space to be dehumidified (for example, the relative humidity is 50% or less), when the thermo-off is performed during the operation in the second operation mode, as the relative humidity of air flowing into the moisture adsorption unit 16 is low, the moisture adsorption unit 16 remains desorbed the moisture.

Consequently, when the operation mode is the second operation mode, the thermo-determination unit 51 determines that the thermo-off is performed, and the relative humidity of air in the space to be dehumidified is lower than the preset humidity, the operation mode control unit 52 selects the first operation mode as the operation mode to restart the thermo-on from the state of the thermo-off.

As described above, even when the thermo-off is performed during the operation in the second operation mode, as the amount of moisture adsorbed by the moisture adsorption unit 16 is small, the thermo-on is restarted in the first operation mode. By performing the first operation mode to restart the thermo-on, the amount of dehumidification larger than that in the second operation mode can be secured.

(Condition Pattern 3)

A description will be given of, in the case of high humidity in the space to be dehumidified, the operation mode when the thermo-off is performed during the operation in the first operation mode and then the thermo-on is performed again.

During the operation in the first operation mode, the moisture adsorption unit 16 retains a large adsorption amount of moisture. In the case of high humidity in the space to be dehumidified (for example, the relative humidity is 80% or more), when the thermo-off is performed during the operation in the first operation mode, the adsorption amount of moisture of the moisture adsorption unit 16 remains large.

Consequently, when the operation mode is the first operation mode, the thermo-determination unit 51 determines that the thermo-off is performed, and the relative humidity of air in the space to be dehumidified is equal to or higher than the preset humidity, the operation mode control unit 52 selects the second operation mode as the operation mode to restart the thermo-on from the state of the thermo-off.

As described above, when the thermo-on is restarted in the state in which the moisture adsorption unit 16 retains a large adsorption amount of moisture, the moisture retained by the moisture adsorption unit 16 can be desorbed by performing the second operation mode.

(Condition Pattern 4)

A description will be given of, in the case of high humidity in the space to be dehumidified, the operation mode when the thermo-off is performed during the operation in the second operation mode and then the thermo-on is performed again.

During the operation in the second operation mode, the moisture adsorption unit 16 has desorbed the moisture. In the case of high humidity in the space to be dehumidified (for example, the relative humidity is 80% or more), when the thermo-off is performed during the operation in the second operation mode, as the relative humidity of air flowing into the moisture adsorption unit 16 is high, the moisture adsorption unit 16 adsorbs the moisture.

Consequently, when the operation mode is the second operation mode, the thermo-determination unit 51 determines that the thermo-off is performed, and the relative humidity of air in the space to be dehumidified is equal to or higher than the preset humidity, the operation mode control unit 52 selects the second operation mode as the operation mode to restart the thermo-on from the state of the thermo-off.

As described above, when the thermo-on is restarted in the state in which the moisture adsorption unit 16 retains a large adsorption amount of moisture, the moisture retained by the moisture adsorption unit 16 can be desorbed by performing the second operation mode.

(Operation Flowchart)

Next, a specific example of control operation when the thermo-on is performed and the thermo-off is performed will be described with reference to FIG. 8.

Figure 8:
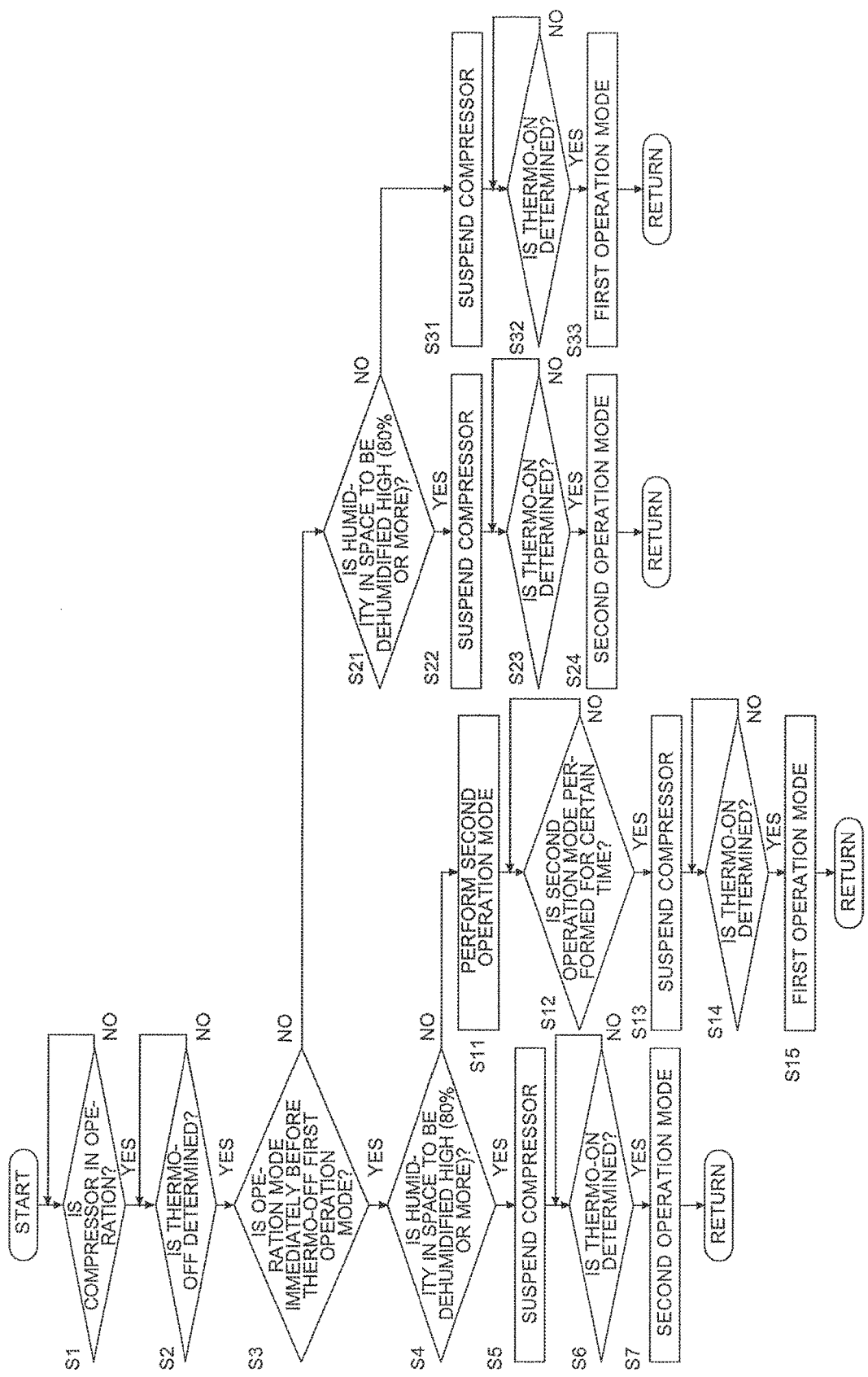
FIG. 8 is a flowchart showing operations of the dehumidification device according to Embodiment 1 of the present invention.

FIG. 8 is a flowchart showing operations of the dehumidification device according to Embodiment 1 of the present invention.

Hereinafter, with reference to steps of FIG. 8, operations of the control device 5 in the dehumidification device 100 according to Embodiment 1 will be described.

The operation mode control unit 52 determines whether or not the compressor 13 is in operation (S1), and when the compressor 13 is in operation, that is, when the thermo-on is performed, determines whether or not the thermo-determination unit 51 determines that the thermo-off is performed (S2). The thermo-determination unit 51 determines that the thermo-off is performed when the relative humidity in the space to be dehumidified is lower than the set humidity. When the thermo-off is determined, the operation mode control unit 52 determines whether or not the operation mode immediately before the determination of the thermo-off is the first operation mode (S3).

When the operation mode immediately before the thermo-off determination is the first operation mode, the operation mode control unit 52 determines whether or not the humidity in the space to be dehumidified measured by the temperature-humidity sensor 2a is equal to or higher than the preset humidity (for example, 80%) (S4). When the humidity in the space to be dehumidified is equal to or higher than the preset humidity, the operation mode control unit 52 instructs the operation control unit 53 to perform the thermo-off, and the operation control unit 53 suspends the compressor 13 to stop circulation of refrigerant in the refrigerant circuit A (S5).

Note that the operation of the air-sending device 12 may be continued in the thermo-off state.

The operation mode control unit 52 determines whether or not the thermo-on is determined by the thermo-determination unit 51 (S6). The thermo-determination unit 51 determines that the thermo-on is performed when the relative humidity in the space to be dehumidified is equal to or higher than the set humidity. When the thermo-on is determined, the operation mode control unit 52 selects the second operation mode as the operation mode to restart the thermo-on, and switches the four-way valve 15. Moreover, the operation mode control unit 52 instructs the operation control unit 53 to perform the thermo-on, and the operation control unit 53 starts operation of the compressor 13 to start circulation of refrigerant in the refrigerant circuit A (S7). Subsequently, the process returns to step S1.

In step S4, when the humidity in the space to be dehumidified is not equal to or higher than the preset humidity, the operation mode control unit 52 controls the four-way valve 15 to switch the operation mode from the first operation mode to the second operation mode. Moreover, the operation mode control unit 52 instructs the operation control unit 53 to continue the operation, and the operation control unit 53 continues the operation of the compressor 13. The operation control unit 53 determines whether or not the operation time in the second operation mode counted by the counter 54 has elapsed a certain preset time (S12). When the operation time in the second operation mode is continued for a certain time, the operation control unit 53 suspends the compressor 13 to stop circulation of the refrigerant in the refrigerant circuit A (S13). Note that the operation of the air-sending device 12 may be continued in the thermo-off state.

The operation mode control unit 52 determines whether or not the thermo-on is determined by the thermo-determination unit 51 (S14). The thermo-determination unit 51 determines that the thermo-on is performed when the relative humidity in the space to be dehumidified is equal to or higher than the set humidity. When the thermo-on is determined, the operation mode control unit 52 selects the first operation mode as the operation mode to restart the thermo-on, and switches the four-way valve 15. Moreover, the operation mode control unit 52 instructs the operation control unit 53 to perform the thermo-on, and the operation control unit 53 starts operation of the compressor 13 to start circulation of refrigerant in the refrigerant circuit A (S15). Subsequently, the process returns to step S1.

In step S3, when the operation mode immediately before the thermo-off determination is not the first operation mode, the operation mode control unit 52 determines whether or not the humidity in the space to be dehumidified measured by the temperature-humidity sensor 2a is equal to or higher than the preset humidity (for example, 80%) (S21). When the humidity in the space to be dehumidified is equal to or higher than the preset humidity, the operation mode control unit 52 instructs the operation control unit 53 to perform the thermo-off, and the operation control unit 53 suspends the compressor 13 to stop circulation of refrigerant in the refrigerant circuit A (S22). Note that the operation of the air-sending device 12 may be continued in the thermo-off state.

The operation mode control unit 52 determines whether or not the thermo-on is determined by the thermo-determination unit 51 (S23). The thermo-determination unit 51 determines that the thermo-on is performed when the relative humidity in the space to be dehumidified is equal to or higher than the set humidity. When the thermo-on is determined, the operation mode control unit 52 selects the second operation mode as the operation mode to restart the thermo-on, and switches the four-way valve 15. Moreover, the operation mode control unit 52 instructs the operation control unit 53 to perform the thermo-on, and the operation control unit 53 starts operation of the compressor 13 to start circulation of refrigerant in the refrigerant circuit A (S24). Subsequently, the process returns to step S1.

In step S21, when the humidity in the space to be dehumidified is not equal to or higher than the preset humidity, the operation mode control unit 52 instructs the operation control unit 53 to perform the thermo-off, and the operation control unit 53 suspends the compressor 13 to stop circulation of refrigerant in the refrigerant circuit A (S31). Note that the operation of the air-sending device 12 may be continued in the thermo-off state.

The operation mode control unit 52 determines whether or not the thermo-on is determined by the thermo-determination unit 51 (S32). The thermo-determination unit 51 determines that the thermo-on is performed when the relative humidity in the space to be dehumidified is equal to or higher than the set humidity. When the thermo-on is determined, the operation mode control unit 52 selects the first operation mode as the operation mode to restart the thermo-on, and switches the four-way valve 15. Moreover, the operation mode control unit 52 instructs the operation control unit 53 to perform the thermo-on, and the operation control unit 53 starts operation of the compressor 13 to start circulation of refrigerant in the refrigerant circuit A (S33). Subsequently, the process returns to step S1.

<<Control to Restart Operation from Suspension or Long-Term Suspension of Operation>>

Next, a description will be given of a control in a case where the operation of the dehumidification device 100 is restarted after the operation has been suspended, or in a case where the operation of the dehumidification device 100 is restarted after the operation has been suspended for a long time.

When the dehumidification operation of the dehumidification device 100 is suspended, or the suspension is prolonged, in some cases, electrical supply is cut by a user by, for example, turning off the main power supply of the dehumidification device 100 or by pulling out the plug of the dehumidification device 100. In particular, for the recent energy conservation measures, users shut off the electric supply in many cases. If the main power supply of the dehumidification device 100 is turned off or the electric supply to the dehumidification device 100 is shut off, the control device 5 cannot obtain the relative humidity in the space to be dehumidified by the temperature-humidity sensor 2a. Consequently, the relative humidity of air flowing into the moisture adsorption unit 16 is also unknown to the control device 5.

As described above, in the case of the low humidity in the space to be dehumidified (for example, the relative humidity of less than 50%), as the amount of moisture adsorbable to the moisture adsorption unit 16 is small, to restart the thermo-on, the operation in the first operation mode is preferred to be started. However, even when the humidity is low in the space to be dehumidified, as the operation suspending state becomes longer, the moisture adsorption unit 16 adsorbs the moisture in air, and consequently, the operation is restarted in the state in which the moisture adsorption unit 16 includes a large adsorption amount of moisture in some cases.

Moreover, as described above, when the electric supply is cut off during the suspension of operation, the relative humidity of air flowing into the moisture adsorption unit 16 becomes unknown.

Consequently, the operation mode control unit 52 selects the second operation mode as the operation mode to restart the operation of the dehumidification device 100 after the operation of the dehumidification device 100 is suspended. Or, the operation mode control unit 52 selects the second operation mode as the operation mode to restart the operation of the dehumidification device 100 after the time the operation of the dehumidification device 100 is suspended exceeds a preset suspension time. In other words, in restart from the suspension of operation, or in restart from long-term suspension, the second operation mode is performed regardless of conditions of the relative humidity of air in the space to be dehumidified. As described above, when the dehumidification device 100 may be restarted in the state where the moisture adsorption unit 16 includes a large adsorption amount of moisture, by performing the second operation mode, the operation can be restarted in the state where the moisture retained by the moisture adsorption unit 16 is desorbed.

<<Effects>>

As described above, in Embodiment 1, the operation mode switching control is performed during the operation transition period of the dehumidification device 100 (when the thermo-on is performed, the thermo-off is performed, or the operation is restarted from suspension of operation or long-term suspension). Consequently, during the operation transition period, dehumidification operation suitable to characteristics of the moisture adsorption unit 16, such as a desiccant material, can be performed.

Note that the configuration and the control operation described in Embodiment 1 are merely a specific example of the dehumidification device of the present invention, and the technical scope of the present invention is not limited to these details. For example, in the condition patterns 1 to 4, the criteria for determining low humidity and high humidity are not limited to the values exemplified above. For example, the criterion for determining low humidity may be set to 55% and the criterion for determining high humidity may be set to 75% using the controller 6. Moreover, regarding the condition pattern 5, similarly, restarting of operation can be changed by the controller to perform the operation from the first operation mode, not from the second operation mode, and is not limited to the method exemplified above.

The invention claimed is:

1. A dehumidification device comprising:
a refrigerant circuit in which a compressor, a flow path switching device, a first heat exchanger, an expansion device, and a second heat exchanger are sequentially connected by pipes, to allow refrigerant to circulate in the refrigerant circuit;
a moisture adsorption unit provided between the first heat exchanger and the second heat exchanger, the moisture adsorption unit being configured to adsorb and desorb moisture in air;
an air-sending device configured to pass air in a space to be dehumidified through the first heat exchanger, the moisture adsorption unit, and the second heat exchanger in order and then send out the air to the space to be dehumidified;
a humidity detection device configured to measure a relative humidity of the air in the space to be dehumidified; and
a control device configured to control the compressor and the flow path switching device, the control device functioning as:
an operation control unit that controls the compressor to switch between thermo-on for circulating the refrigerant in the refrigerant circuit and thermo-off for suspending circulation of the refrigerant, and
an operation mode control unit that controls the flow path switching device to switch an operation mode, the operation mode including a first operation mode in which the moisture adsorption unit is caused to adsorb moisture by causing the first heat exchanger to act as an evaporator and causing the second heat exchanger to act as a condenser or a radiator and a second operation mode in which moisture retained in the moisture adsorption unit is caused to be desorbed by causing the first heat exchanger to act as a condenser or a radiator and causing the second heat exchanger to act as an evaporator,
the operation mode control unit, at a time when the thermo-on is switched from the thermo-off, selecting the operation mode in response to a previous operation mode and a previous relative humidity of the air.

2. The dehumidification device of claim 1, wherein
the operation mode control unit switches the operation mode to the second operation mode in a case where the operation mode in switching from the thermo-on to the thermo-off is the first operation mode and the relative humidity of the air is lower than a preset humidity,
the operation control unit switches from the thermo-on to the thermo-off in a case where an operation time in the second operation mode is continued for a preset time, and
the operation mode control unit selects the first operation mode as the operation mode at a time when the thermo-on is switched from the thermo-off.

3. The dehumidification device of claim 1, wherein
the operation mode control unit selects the first operation mode as the operation mode at a time when the thermo-on is switched from the thermo-off in a case where the operation mode in switching from the thermo-on to the thermo-off is the second operation mode and the relative humidity of the air is lower than a preset humidity.

4. The dehumidification device of claim 1, wherein
the operation mode control unit selects the second operation mode as the operation mode at a time when the thermo-on is switched from the thermo-off in a case where the operation mode in switching from the thermo-on to the thermo-off is the first operation mode and the relative humidity of the air is equal to or higher than a preset humidity.

5. The dehumidification device of claim 1, wherein
the operation mode control unit selects the second operation mode as the operation mode at a time when the thermo-on is switched from the thermo-off in a case where the operation mode in switching from the thermo-on to the thermo-off is the second operation mode and the relative humidity of the air is equal to or higher than a preset humidity.

6. The dehumidification device of claim 1, wherein
the operation mode control unit selects the second operation mode as the operation mode at a time when operation of the dehumidification device is restarted after the operation is suspended.

7. The dehumidification device of claim 1, wherein
the operation mode control unit selects the second operation mode as the operation mode at a time when operation of the dehumidification device is restarted after a time the operation of the dehumidification device is suspended exceeds a preset suspension time.

\* \* \* \* \*